United States Patent [19]
Wickersheim et al.

[11] Patent Number: 5,317,750
[45] Date of Patent: May 31, 1994

[54] MICROCONTROLLER PERIPHERAL EXPANSION BUS FOR ACCESS TO INTERNAL SPECIAL FUNCTION REGISTERS

[75] Inventors: Robert Wickersheim, Mesa; Hamed H. Amini, Queen Creek, both of Ariz.

[73] Assignee: Intel Corporation, Santa Clara, Calif.

[21] Appl. No.: 984,280

[22] Filed: Dec. 1, 1992

Related U.S. Application Data

[63] Continuation of Ser. No. 541,477, Jun. 22, 1990, abandoned, which is a continuation of Ser. No. 289,198, Dec. 23, 1988, abandoned.

[51] Int. Cl.⁵ ............................................. G06F 13/00
[52] U.S. Cl. .................................... 395/725; 364/247; 364/238.3; 364/239.7; 364/927.93; 364/939.3; 364/940.7; 364/933.63; 364/DIG. 1; 395/275; 395/325
[58] Field of Search .......................... 395/725, 275, 325

[56] References Cited

U.S. PATENT DOCUMENTS

| | | | |
|---|---|---|---|
| 3,831,149 | 8/1974 | Job | 364/900 |
| 4,115,852 | 9/1978 | Rozell | 364/200 |
| 4,200,930 | 4/1980 | Rawlings | 364/200 |
| 4,287,562 | 9/1981 | Darden | 364/200 |
| 4,370,708 | 1/1983 | Bruce et al. | 364/200 |
| 4,549,262 | 10/1985 | Chung | 364/200 |
| 4,558,412 | 12/1985 | Inoshita | 364/200 |
| 4,571,676 | 2/1986 | Mantellina | 364/200 |
| 4,575,792 | 3/1986 | Keeley | 364/200 |
| 4,658,350 | 4/1987 | Eggebrecht | 364/200 |
| 4,674,089 | 6/1987 | Poret et al. | 371/25 |
| 4,688,166 | 8/1987 | Schneider | 364/200 |
| 4,782,439 | 11/1988 | Borkar | 364/200 |
| 4,926,363 | 5/1990 | Nix | 364/579 |
| 5,047,922 | 9/1991 | Borkar | 364/200 |
| 5,062,034 | 10/1991 | Bakker | 364/200 |
| 5,193,204 | 3/1993 | Qureshi et al. | 395/800 |

*Primary Examiner*—Parshotam S. Lall
*Assistant Examiner*—Ken S. Kim
*Attorney, Agent, or Firm*—Blakely, Sokoloff, Taylor & Zafman

[57] ABSTRACT

A microcontroller with the capability of allowing a user to expand the capabilities of the controller such that the added functionality performs as if the controller were designed with that added functionality onboard. This capability is implemented by providing at the pinouts of the controller access to a special function register area onboard the controller, as well as certain internal control signals. Each peripheral controller which is desired to be interfaced with the microcontroller must have a special address decoding block added. By use of the present invention, a microcontroller can be customized to a user's specifications without the costs associated with a custom designed chip.

4 Claims, 2 Drawing Sheets

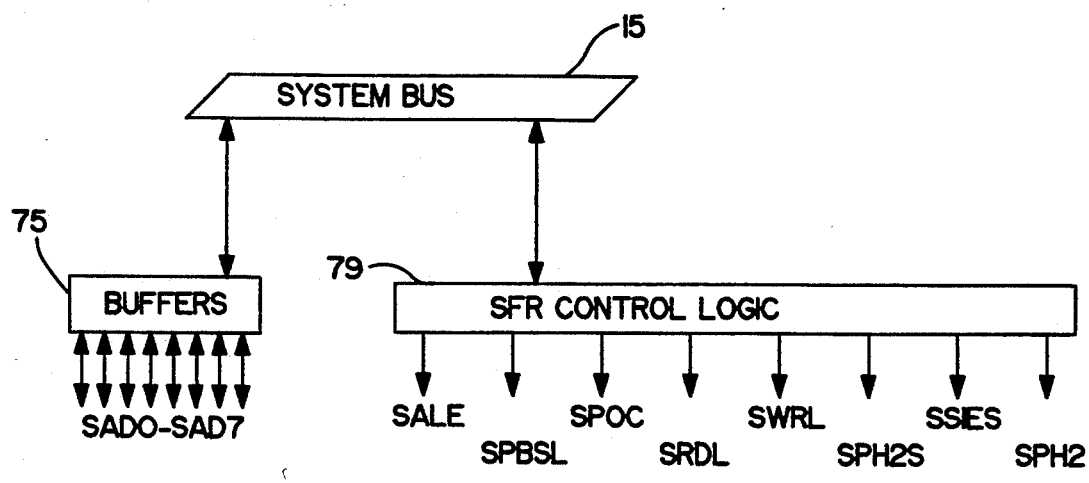
FIG. 2
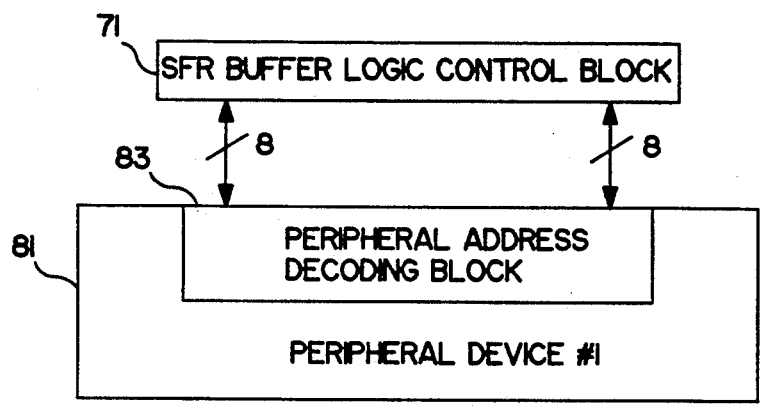
FIG. 3
| F8 | | | | | | | | | FF |
|---|---|---|---|---|---|---|---|---|---|
| F0 | B | | | | | | | | F7 |
| E8 | | | | | | | | | EF |
| E0 | ACC | | | | | | | | E7 |
| D8 | | | | | | | | | DF |
| D0 | PSW | | | | | | | | D7 |
| C8 | | | | | | | | | CF |
| C0 | | | | | | | | | C7 |
| B8 | IP | | | | | | | | BF |
| B0 | P3 | | | | | | | | B7 |
| A8 | IE | | | | | | | | AF |
| A0 | P2 | | | | | | | | A7 |
| 98 | SCON | SBUF | | | | | | | 9F |
| 90 | P1 | | | | | | | | 97 |
| 88 | TCON | TMOD | TL0 | TL1 | TH0 | TH1 | | | 8F |
| 80 | P0 | SP | DPL | DPH | | | | PCON | 87 |
FIG. 4

MICROCONTROLLER PERIPHERAL EXPANSION BUS FOR ACCESS TO INTERNAL SPECIAL FUNCTION REGISTERS

This is a continuation of application Ser. No. 07/541,477 filed Jun. 22, 1990 which is a continuation of application Ser. No. 07/289,198 filed Dec. 23, 1988, now both abandoned.

BACKGROUND OF THE INVENTION

1. Field Of The Invention

This invention relates to the field of single chip microprocessors and controllers. In particular, this invention relates to circuitry which brings certain internal signals of a controller to the user interface to allow a user to customize the controller for use with peripheral devices without the expertise of custom layout and device/circuit engineers.

2. Prior Art

Single chip microcontrollers having onboard functionality usually performed by peripheral controllers are well known devices. A representative controller sold by Intel Corporation having such onboard functionality is known as an 8051 microcontroller which incorporates a serial channel which provides input/output for serial devices. In the 8051 controller, a special function register (SFR) area is provided which is used by the software to "talk" to the outside world. Although not part of a standard 8051 controller, other frequently desired functionality includes analog-digital and digital-analog converters as well as various special purpose controllers. While it is possible in the prior art to provide such additional functionality by allocating one or more of the onboard ports as an address and data bus, since not all controller instructions can address the data and address bus normally used to interface with peripheral devices, additional programming is necessary which necessarily slows down input/output, requires additional memory space and generally results in poorer performance. For example, in an 8051 microcontroller, only 4 out of 76 instructions, and none of the bit manipulation instructions, can directly access a peripheral device controller attached to a port.

SUMMARY OF THE INVENTION

A microcontroller is disclosed having the capability of allowing a user to expand the capabilities of the controller such that the added functionality performs as if the controller were designed with that added functionality onboard. The invented controller implements this capability by providing at the pinouts of the controller access to the SFRs as well as certain internal control signals. While each peripheral controller which is desired to be interfaced with the microcontroller must have a special address decoding block added, the benefits made available by the invention far outweigh the additional costs associated with adding a special decoding block to a peripheral controller. For example, whether a peripheral controller is onboard or external to the microcontroller will be totally transparent to a user. Additionally, since there is no one set of functionality which is useful to all users, it is impossible to design a chip which includes onboard all possible desired functionalities at an acceptable cost. By the present invention, a user can tailor a microcontroller to his specifications without the costs associated with a custom designed chip.

BRIEF DESCRIPTION OF THE DRAWINGS

FIG. 2 is a block diagram showing an implementation of SFR buffer control block 71.

FIG. 3 is a block diagram showing the SFRB of the present invention.

FIG. 4 is a table showing the SFR area.

DETAILED DESCRIPTION OF THE INVENTION

Figure 1:
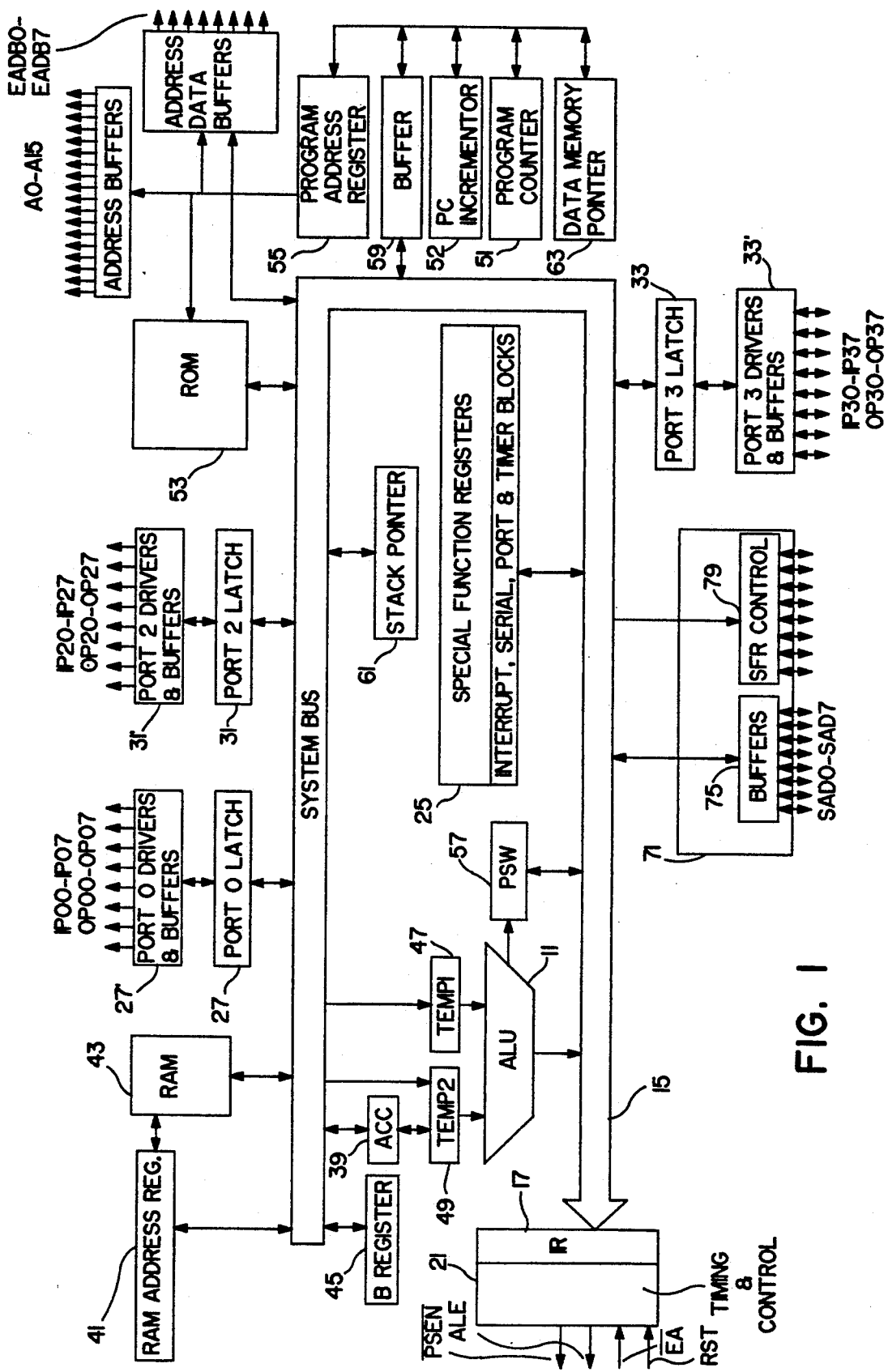
FIG. 1 is a block diagram showing the main elements of a single chip microprocessor.

A method and apparatus is disclosed for implementing in a single chip microcontroller. Specific numbers of bytes, bits, registers, addresses, clock signals, control signals, etc. have been set forth for purposes of explanation in order to provide a thorough understanding of the invention. However, it should be apparent to one skilled in the art that the present invention may be practiced without these specific details. In other instances, well known circuits and devices are shown in block diagram form in order not to obscure the present invention unnecessarily.

In order to simplify the understanding of the invention, rather than describing the invention in abstract terms, many of the descriptions herein are in terms of a specific processor, namely the Intel 8051 microcontroller, as specified in a publication entitled "Microcontroller Handbook," Order No. 210918-004 available from Intel Corporation, Santa Clara, Calif. However, it should be understood that the invention is not limited for use by any specific processor.

Referring now to FIG. 1, the main components of a microprocessor with three onboard ports is shown. The microprocessor comprises an arithmetic/logical unit (ALU) 11, a system bus 15, an instruction register (IR) 17, timing and control logic 21, special function register (SFR) area 25, latch registers 27, 31, 33 and input buffers/output drivers 27', 31', 33' corresponding respectively to ports P0, P2, and P3. Also shown are accumulator (ACC) 39, RAM address register 41, random access memory (RAM) 43, additional registers B 45, Temp1 47, and Temp2 49, program counter (PC) 51, PC incrementer 52, ROM 53, program memory address register 55, program status word (PSW) register 57, buffer 59, stack pointer 61 and data memory pointer (DTPR) 63, all of which are well known in the art and usually needed for proper operation of a single chip microprocessor or controller. The particular manner in which these elements are coupled to each other and operate, as well as additional components, depends upon the particular architecture utilized, which details will be described herein only to the extent necessary for a complete understanding of the invention.

Coupled to ports P0 and P2 through an 8 bit bus there may be an external program memory and an external data memory. Timing and control signals for the two external memories are generated through port P3. The program memory contains processor instructions of the usual type. Data to be manipulated by the microprocessor is stored in the data memory. Details regarding the accessing and loading of instructions from the program memory and manipulating data in the data memory are well known in the art and therefore, except to the extent necessary for a proper understanding of the subject invention, will not be described.

FIG. 1 differs from a prior art microcontroller mainly by the addition of SFR buffer logic control block 71 which reads and writes the eight address signals SAD-0–SAD7 and generates the eight control/clock signals SALE, SPBSL, SPOC, SRDL, SWRL, SPH2S, SS1ES, and SPH2. In FIG. 1, SFR buffer logic control block 71 includes buffers 75 and SFR control logic 79. In this connection, the inputs and outputs of SFR buffer logic control block 71 utilize the pinouts that would otherwise be used by port 1. However, SFR buffer logic control block 71 could have its own pinouts if port 1 is needed, but of course a different packaging would be needed with 16 additional pinouts to accommodate the inputs and outputs of SFR buffer logic control block 71.

Although not part of the invention, the following discussion of 8051 microarchitecture is provided so that the invention may be better understood.

The 8051 clock is internally divided to generate two non-overlapping phases. One phase is equal to one external clock cycle. Two phases, called Ph1 and Ph2, constitute a "State". One state is equal to two external clocks. Six states make a "Cycle". The states, within a cycle, are numbered from 1 to 6; i.e. S1, S2 . . . S6. The cycles are numbered from 1 to 4; i.e. C1, C2, C3, C4. Instructions execute in integer multiples of cycles. Most of the instructions take one or two cycles to execute.

Timing and control logic 21 of the CPU accesses SFR registers as follows. The 8 bit address of a SFR register 25 is specified in the second byte of an instruction. This byte is available on internal bus 15 during Ph2 of S4. Control logic 21 asserts a signal IB%ARS indicating that the address matches that of one of the SFR registers. This information is stored for the duration of the instruction execution. In the next state, S5, control logic 21 asserts a read signal RD. The contents of the addressed SFR register is placed on internal bus 15, for storage into one of the temporary registers 47 and 49 of ALU 11. In the following state, S6, ALU 11 performs an arithmetic/logical operation on the data and places the results on internal bus 15. This modified data is latched into the addressed SFR register.

In short, the address of a SFR is made available in S4. The selected register is read in S5. And finally the data is written into the SFR in S6. In the case of two cycle instructions, the same steps are followed, but in different cycles.

The Intel 8051 family of microcontrollers allows up to 128 SFR registers which are used as internal control and status registers, although only a few are used. The onboard I/O ports P0, P1, if present, P2 and P3 are addressed through this register space. The instructions which read, write, read-modify-write, and bit manipulate the SFRs, belong to the SFR space.

Referring now to FIG. 2, the various signals generated and utilized by SFR buffer logic control block 71 will be described.

SFR buffer logic control block 71 allows the SFR registers 25 to "talk" to peripheral devices designed to be interfaced with the invented device over a SFR bus (SFRB) which includes the address and data signals SAD0–SAD7, the control signals SWRL, SALE, SDRL, SPOC and SPBSL, and the clock signals SPH2, SPH2S and SS1ES generated by SFR control block 71, each of which will now be described.

The SFRB is a synchronous bus which allows peripheral cells external to the controller to be accessed through the onboard SFRs. SAD0–SAD7 is a static bus used for address and data which is driven by the controller when it is sending information to a peripheral cell address and which is driven by the peripheral cell when it is sending information to the controller.

SWRL is an active low signal and transfers the contents of SAD0–SAD7 to the data register of the peripheral cell during S6, or during S4 for bit addressable instructions. SWRL corresponds to the controller's internal address write (WR) signal which is designated IB%AR.

SALE is an active high signal which indicates that the SAD0–SAD7 contain a valid address of a peripheral cell. SALE occurs during S4 and S1. Of course, each peripheral cell coupled to the SFRB should have a unique address and an address decoder as described below. SALE corresponds to the controller's internal address latch enable (ALE) signal which is designated IB%ARS.

SDRL is an active low signal and transfers the contents of the data register of the peripheral cell which was addressed when SALE was asserted. SDRL occurs during S5. SDRL corresponds to the controller's internal read (RD) signal which is designated AR%IB.

SPOC is an active high signal generated by the controller and is used to set all internal registers of the addressed peripheral cell to a known state. SPOC corresponds to the controller's internal reset (POC) signal.

SPBSL is an active low signal corresponding to the controller's port buffer select signal (PBSL). This signal is active during instructions which read the latch of an I/O port rather than the port's input pins. That is, referring to FIG. 1, when SPBSL is asserted, data which is in one of latches 27, 31 or 33 is read, modified by the accumulator and then written back to the latch. Such instructions are usually bit manipulation instructions.

SPH2 corresponds to the controller's internal PH2 signal and is used to synchronize the peripheral cells to the controller clock. It is also used by the peripheral cells as part of their internal two phase clocking scheme.

SPH2S corresponds to the controller's internal phase 2 sleep clock PH2S. It is used to synchronize peripheral cells which are to be active during the IDLE mode of the controller and as part of their internal two phase clocking scheme.

SS1ES corresponds to the controller's internal state 1 early sleep signal. It begins during state 6, phase 2 (S6P2) which is the last state of an instruction, and lasts until S1P1. This signal is active during the IDLE mode of the controller. All other timing states that a peripheral cell may require can be generated from SS1ES.

SFR buffer logic control block 71 may be implemented by buffers 75 and SFR control logic 79. In this connection, buffers 75, which are a set of tri-stateable, bi-directional buffers, take the internal controller data and address signals on bus 15 which are to be output, and generate signals appropriate to be placed on the pinouts, or, when receiving signals from a peripheral cell, take the signals on SAD0–SAD7 and place them on bus 15.

SFR control logic 79 may be implemented as a set of non-inverting buffers, take the internal controller control and clock signals which are to be output, and generate signals appropriate to be placed on the pinouts. SFR control logic 79 does not receive any inputs from the peripheral cells.

Referring now to FIG. 3, peripheral address decoding block 83 receives the signals SAD0–SAD7 as well as the control and clock signals SWRL, SALE, SDRL, SPOC, SPBSL, SPH2, SPH2S and SS1ES.

The SFR Peripheral Cell Decoding Scheme

The manner in which peripheral address decoding block 83 may be implemented will now be described. Any cell which is directly connected to the SFRB is referred to as an SFR cell or peripheral cell. The controller accesses these cells by reading/writing their address memory locations in the SFR area. To use these cells, at least one unique memory location must be associated with each cell. Each peripheral cell may contain multiple registers, and each register in the cell will have a different SFR address associated with it.

Peripherals can be placed at most of the available locations within the memory map of the SFR area. If a peripheral holds more than one register, the register with the lowest address will be programmed at one address and the other registers associated with the SFR peripheral cell will be programmed to the addresses following the first register. When a peripheral cell holds more than one register it is restricted to 'X0H, 'X4H, 'X8H and 'XCH as valid addresses within the SFR memory map, where X is 0-F hexidecimal.

To make the SFR memory location of these registers programmable, each peripheral cell has 16 signals, each of which will have the corresponding SAD0-SAD7 line, VCC, or VSS tied to it, depending on the address the register is to be placed. The pins are called AD0-AD7 and ADBAR0-ADBAR7. Each peripheral cell also has a pin called BITADDR which will be tied high if the first register of the block is bit-addressable, otherwise it will be tied low.

If a specific bit of the SFR cell address contains a "1", then the corresponding SAD0-SAD7 line should be tied to the corresponding AD0-AD7 line. If a specific bit of the SFR cell's address contains a "0", then the corresponding SAD0-SAD7 line should be tied to the corresponding ADBAR0-ADBAR7 line. Once all the SAD0-SAD7 lines have been tied to either an AD0-AD7 line or an ADBAR0-ADBAR7 line, the AD lines that do not have an input must be tied to VCC and the $\overline{AD}$ lines that do not have an input must be tied to VSS. For example, if the SFR peripheral cell address were C8H, then the following connections would be made:

SAD0-ADBAR0
SAD1-ADBAR1
SAD2-ADBAR2
SAD3-AD3
SAD4-ADBAR4
SAD5-ADBAR5
SAD6-AD6
SAD7-AD7
AD0, AD1, AD2, AD4 and AD5-VCC
ADBAR3, ADBAR6 and ADBAR7-VSS A bit-addressable SFR cell can reside at any location inside a row in the SFR area memory map. The only requirement is that only one bit-addressable peripheral cell is allowed per row, with the rest of the locations for that row being used as non-bit-addressable addresses. What distinguishes a bit-addressable module from a non-bit-addressable module is the BITADDR pin. For a peripheral cell to be bit-addressable, the BITADDR pin must be tied high.

As an example, a bit-addressable SFR cell is placed at address 0C3H. If bit 5 of the module is to be cleared, then CLR 0C5H will do the job. Similarly, if bit 7 is to be set, then SETB 0C7H will suffice. No other locations in the same row will be affected since they all will have their BITADDR's lines tied low.

FIG. 4 is the SFR memory map showing what addresses are available for placing peripheral cells. That is, except for the locations which indicated as being in use, all other SFR locations are available for use by peripheral cells.

We claim:

1. An integrated circuit microcontroller having an internal bus, an arithmetic logical unit for manipulating data on said internal bus, a special function register area which includes an addressing space for accessing certain registers on board the microcontroller used by the arithmetic logical unit, and timing and control logic for generating timing and control signals necessary for the operation of the microcontroller based upon a microcontroller instruction to be executed by said microcontroller, said microcontroller adapted to provide access to said special function register area and certain of said timing and control signals by a peripheral cell external to the microcontroller wherein at least one register in said special function register area is assigned to said peripheral cell such that each of said at least one registers has a unique address, said microcontroller comprising:

a) a plurality of buffer means, each coupled to a corresponding set of input/output pins and to said internal bus, each of said sets of input/output pins for coupling to said peripheral cell, each of said buffer means for transferring address information and data information from said at least one assigned register in said special function register area using said unique address to its said corresponding set of input/output pins, and for transferring address information and data information to said at least one assigned register in said special function register area using said unique address from said corresponding set of input/output pins; and b) control logic means coupled to said internal bus and to a set of control pins for coupling to said peripheral cell for receiving a first set of control and timing signals generated by said timing and control logic, generating a second set of control and timing signals corresponding to said first set of control and timing signals, and transferring said second set of control and timing signals to said control pins;

c) wherein said set of control pins and said set of input/output pins are in parallel with each other.

2. The apparatus defined by claim 1 wherein each of said plurality of buffer means comprises a tri-stateable, bi-directional buffer.

3. The apparatus defined by claim 1 wherein said control logic means places the signals SWRL, SALE, SDRL, SPOC, SPBSL, SPH2, SPH2S and SS1ES on said control pins, wherein the signal SWRL corresponds to an internal address write signal of said microcontroller, the signal SALE corresponds to an internal address latch enable signal of said microcontroller, the signal SDRL corresponds to an internal address read signal of said microcontroller, the signal SPOC corresponds to an internal reset signal of said microcontroller, the signal SPBSL corresponds to a port buffer select signal of said microcontroller, the signal SPH2 corresponds to an internal phase 2 signal of said microcontroller, the signal SPH2S corresponds to an internal phase 2 sleep of said microcontroller, and the signal SS1ES corresponds to an internal state 1 early sleep signal of said microcontroller.

4. The apparatus defined by claim 3 wherein said control logic means comprises a non-inverting buffer for each of said signals SWRL, SALE, SDRL, SPOC, SPBSL, SPH2, SPH2S and SS1ES.

* * * * *